Patented Nov. 1, 1938

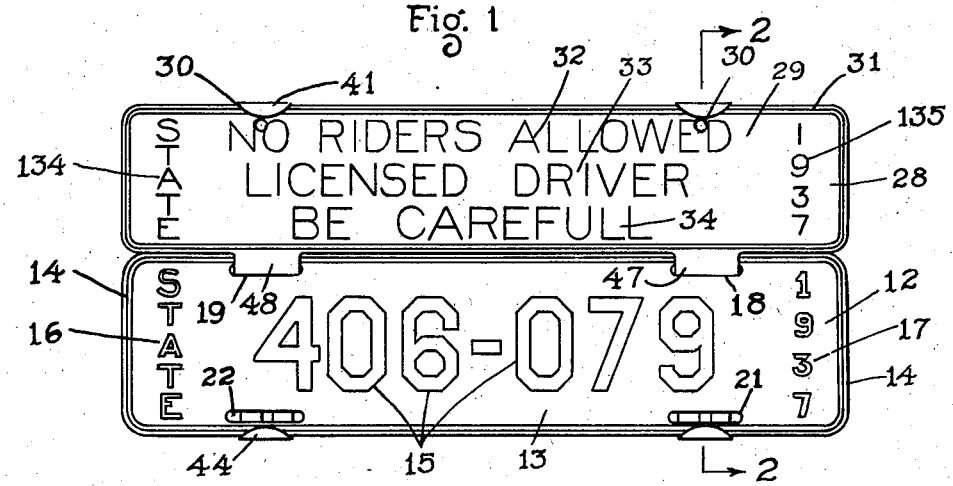

2,135,191

UNITED STATES PATENT OFFICE 2,135,191

PLATE ASSEMBLY

John A. McBrady, Valley City, N. Dak.

Application June 1, 1937, Serial No. 145,660

5 Claims. (Cl. 40—125)

My invention relates to plate assemblies and has for an object to provide a plate assembly which may be readily attached to the license bracket of a motor vehicle.

Another object of the invention resides in providing a plate assembly whereby a companion plate may be supported in proximity to the license plate of the motor vehicle.

An object of the invention resides in providing a construction whereby the companion plate may be properly mounted without alteration of the license bracket or the license plate.

A still further object of the invention resides in providing a support for the plates adapted to accommodate any type and size of license plate and companion plate.

A feature of the invention resides in providing a companion plate adapted to be used in conjunction with a license plate having a slot in the upper marginal portion thereof.

A still further object of the invention resides in constructing the companion plate with a tongue adapted to enter the slot, whereby the companion plate is positioned relative to the license plate.

Another object of the invention resides in providing a support on which both plates are mounted and in securing said tongue directly to the support.

A still further object of the invention resides in constructing the support with two arms adapted to overlie one another and to utilize a bolt extending jointly through the tongue and both of the arms for holding the parts assembled.

Another object of the invention resides in constructing the arms with slots through which the bolt extends and which slots are adapted to overlie the other slot of the license plate and an opening in the companion plate so that the plate assembly may be attached to the license bracket either through the companion plate or license plate.

Other objects of the invention reside in the novel combination and arrangement of parts and in the details of construction hereinafter illustrated and/or described.

In the drawing:

Fig. 1 is a front elevational view of a plate assembly illustrating an embodiment of my invention.

Fig. 2 is a cross sectional view taken on line 2—2 of Fig. 1 and drawn to a larger scale.

Fig. 3 is a rear view of the plate assembly showing the same attached to the license bracket through the companion plate.

Fig. 4 is a fragmentary view similar to Fig. 3 showing the plate assembly attached to the license bracket through the license plate.

In the use of motor vehicles it frequently becomes desirable to apprise the public of information in conjunction with the operation of the motor vehicle in addition to that ordinarily furnished on the license plate. For this purpose companion plates have been secured to the license plate and have been variously attached thereto. In the attachment of such plates the companion plate is usually insecurely held in position with the result that frequently the same becomes disengaged and broken or lost. The present invention provides a construction whereby the two plates are rigidly held attached to a support which is secured to the license bracket in such a manner as to prevent disengagement of the plates one from the other or loss of either thereof.

My invention can be used with any of the standard forms of license plates and the license bracket for supporting the same and for the purpose of illustration an ordinary form of license plate 12 has been shown in the drawing. This license plate is provided with a body 13 and is constructed from sheet metal, being preferably stamped into the desired shape. The body 13 has a head or ridge 14 extending circumferentially about the same. Upon the face of the body 13 are provided the usual numbers 15 which give the license number of the owner of the vehicle and with further data such as indicated at 16 and 17, giving the State from which the license was issued and the year during which the license is in force. The various notations on the plate may be printed thereon, as shown in the drawing, or the same may be both printed and embossed as is frequently the case. For the sake of simplicity plain printing has been illustrated, though it can be readily comprehended that the invention is capable of use with plates of either type.

The license plate 12 is constructed at its upper marginal portion with two longitudinally extending slots 18 and 19 and at its lower marginal portion with two longitudinally extending slots 21 and 22. These slots are disposed inwardly of the bead 14 and are symmetrically situated, the slot 18 being directly above the slot 21 and the slot 19 being directly above the slot 22. These slots are provided for attachment of the license plate to the license bracket provided with the motor vehicle.

Inasmuch as the invention can be applied to any license bracket, a conventional form of license bracket has been shown in the drawing, which is indicated in its entirety by the reference numeral 23. This license bracket consists of a shank 24 which is provided with a bar 25 connected therewith. The shank 24 is attached to some portion of the motor vehicle and supports the bracket relative thereto. The bar 25 is constructed with slots 26 and 27 at its ends by means of which the license plate 12 may be attached to the bracket through either the slots 18 or 19 or the slots 21 and 22.

In conjunction with the license plate 12 a companion plate 28 is utilized which may be constructed similar to the license plate 12. This companion plate is provided with a body 29 constructed of sheet metal which, similar to the license plate 12, has a bead 31 extending marginally about the same. Upon the body 29 is printed any appropriate notation which may be desired. For the purpose of illustration, I have shown at 32, 33 and 34 suitable notations indicating desirable messages or giving desirable data to be conveyed to the public. In addition the State of the driver and the year of his license may be indicated at 134 and 135. The various notations on the plate 28 may be either printed or printed and embossed, the same as the license plate 12. At the uppermost marginal portion of the body 29 of plate 28 and adjacent the bead 31 are provided two openings which are situated in alignment with the slots 18 and 21 and the slots 19 and 22. These openings serve a purpose to be presently more fully described.

For supporting the two plates on the bracket 23 two supports 36 and 37 are employed. Both of these supports being identical in construction only the support 36 will be described in detail. This support consists of two arms 38 and 39 which are identical in construction. Arm 38 is elongated in form and is provided at one end with a finger 41 which is adapted to hook over the upper edge of the plate 38 and overlie the bead 31 thereon. This arm is of a length greater than the width of the plate 28 and extends downwardly over the plate 12. Arm 38 is provided with a slot 42 which extends to within a short distance of the finger 41 and to within a short distance of the other end 43 thereof. Arm 39 is similarly provided with a finger 44 which engages the lower edge of the plate 12 and is further provided with a slot 45 which extends across the slot 21 and to within a short distance of the other end 46 of said arm.

The lowermost marginal portion of the plate 28 is formed with two tongues 47 and 48. These tongues are adapted to extend through the slots 18 and 19 of plate 12 and to overlie the back side of the plate 12. These tongues prevent relative longitudinal movement of the plates with respect to one another and also hold the plates in coplanar relation. The manner in which the tongues cooperate with the slots 18 and 19 is best shown in Fig. 2. A bolt 51 provided with a countersunk head 52 and a shank 53 is utilized to secure the parts together. This bolt passes through the two slots 42 and 45 at the ends 43 and 46 of arms 38 and 39 and the head 52 thereof is received within a socket 54 in the tongue 48. A nut 55 screwed upon the shank 53 of this bolt holds the parts in assembled relation.

The manner of assembling the parts of the invention is as follows: The plate 29 is first applied to the plate 12 by inserting the tongues 47 and 48 into the slots 18 and 19 so that the said tongues project outwardly beyond the back surface of the plate 12. Before the plates are brought into coplanar relation the bolts 51 are inserted through the opening formed by the sockets 54 and the heads 53 of said bolts caused to be received within said sockets. The two plates are then adjusted until the same are in coplanar relation, which holds the heads of the bolts in contact with the rear surface of the plate 12. The assembled structure is then laid face downward upon a table or other flat support. Support 36 is first applied. Arm 39 thereof is next applied and the finger 44 thereof hooked under the lower edge of the plate 12. The shank 53 of bolt 51 is at the same time received in the slot 45 thereof. Arm 38 is next applied in the same manner. The two arms are then drawn together by applying pressure to the ends thereof and the nut 55 screwed upon the shank 53 of the bolt and tightened down to hold the parts in rigid position. Thereafter the support 37 is similarly applied and the plate assembly is ready to be attached to the bracket 23.

Attachment of the plate assembly to the bracket 23 may be accomplished in three different ways. If desired, the shanks 53 of the bolts 51 may be inserted through the slots 26 and 27 of the bar 25 of bracket 23 and lock washers 56 and nuts 57 applied to the same to hold the assembly attached to the bracket by means of these bolts. This arrangement of parts is shown in Fig. 2. If desired, however, the assembly may be supported through the companion plate 28 in which case bolts indicated in dotted lines in Fig. 3 by the reference numeral 157 are inserted through the openings 30 of the companion plate 28, the slots 42 in the arms 38 of the supports 36 and 37 and the slots 26 and 27 of the bar 25 of bracket 23. These bolts are provided with nuts and lock washers as described in conjunction with the attachment of the device as shown in Fig. 2. In Fig. 4 the assembly has been shown as mounted through attachment to the license plate 12 which is accomplished by using bolts 58 which pass through the slots 21 and 22 of the plate 12, the slots 45 of the arms 39 of supports 36 and 37 and through the slots 26 and 27 of the bar 24 of bracket 23. Nuts 59 and lock washers not shown clamp the parts in rigid position.

It will readily be comprehended that with my invention the two plates are rigidly and securely assembled relative to one another so that neither plate can become accidentally detached from one another. By means of the tongues used and the particular type of supports used the plates are rigidly supported and firmly held in coplanar relation. By means of the three methods of assembly to the license bracket, the assembly may be adjusted to accommodate different conditions so that the assembly can be mounted on any motor vehicle without changing the bracket or interfering with parts of the vehicle which might be in the way. The supports are extremely simple in construction and consist of identical arms which permit of economy in manufacture. By means of this construction the companion plate may be attached to the motor vehicle without altering the license bracket or drilling or altering the license plate. The only tool necessary to install the invention is a pair of pliers.

Changes in the specific form of my invention, as herein disclosed, may be made within the scope of what is claimed without departing from the spirit of my invention.

Having described my invention, what I claim as new and desire to protect by Letters Patent is:

1. In combination with a license plate having a slot at the upper marginal portion thereof, a companion plate formed with a tongue adapted to extend through the slot and to overlie the back side of the license plate, a pair of arms, one for each plate, fingers on the ends of the arms for engagement with the outer edges of the plates, said arms overlying said tongue, and fastening means extending jointly through said tongue and arms.

2. In combination with a license plate having a slot at the upper marginal portion thereof, a companion plate formed with a tongue adapted to extend through the slot and to overlie the back side of the license plate, a pair of arms, one for each plate, fingers on the ends of the arms for engagement with the outer edges of the plates, said arms overlying said tongue, and fastening means extending jointly through said tongue and arms, said fastening means being disposed entirely in back of said license plate.

3. In combination with a license plate having a slot at the upper marginal portion thereof, a companion plate formed with a tongue adapted to extend through the slot and to overlie the back side of the license plate, a pair of elongated arms, one for each plate, said arms having longitudinally extending slots therein, fingers on the ends of the arms for engagement with the outer edges of the plates, said arms overlying said tongue, and a bolt extending jointly through said tongue and the slots in the arms for holding the plates attached to said arms.

4. In combination with a license plate having a slot at the upper marginal portion thereof and a corresponding slot at the lower marginal portion thereof, a companion plate formed with a tongue adapted to extend through the upper slot and to overlie the back of the license plate, an arm overlying the back of the license plate and having a slot extending across the lower slot in the license plate and said tongue, a second arm extending across the companion plate, means on said arms for attaching the plates thereto, and a bolt extending jointly through said tongue and slot in said first named arm and said second named arm for holding the parts secured relative to one another, and fastening means extending jointly through the lowermost slot of the license plate and the slot of said first named arm for attachment to a license bracket.

5. In combination with a plate having a slot therein adjacent one of the edges thereof, a companion plate disposed in coplanar juxtaposition with respect to said first named plate and having an edge adjoining the denoted edge of said first named plate, a tongue on said companion plate issuing from said denoted edge of said companion plate and offset from the plane thereof, said tongue extending through said slot and overlying said first named plate on one side thereof, said tongue having an opening therein, a support for said plates engaging the plate formed with the slot therein and having an opening registering with the opening in said tongue and a fastener extending through the opening in said tongue and support for securing the parts together and being disposed wholly on one side of said plates to conceal the same from view.

JOHN A. McBRADY.